(12) United States Patent
Kayatani et al.

(10) Patent No.: US 6,279,716 B1
(45) Date of Patent: Aug. 28, 2001

(54) APPARATUS FOR MOVABLY SUPPORTING ARTICLE

(75) Inventors: Fuminori Kayatani; Yukinobu Iwasaki, both of Hyogo-ken; Hidenori Kono, Himeji; Kaoru Iguchi, Tokyo, all of (JP)

(73) Assignees: SR Engineering Company, Limited, Kobe; Iguchikiko Seisakusho Company, Limited, Tokyo, both of (JP)

( * ) Notice: Subject to any disclaimer, the term of this patent is extended or adjusted under 35 U.S.C. 154(b) by 0 days.

(21) Appl. No.: 09/491,027

(22) Filed: Jan. 25, 2000

(30) Foreign Application Priority Data

Jan. 28, 1999 (JP) .................................................. 11-020249

(51) Int. Cl.[7] .................................................. B65G 13/00
(52) U.S. Cl. .................................. 193/35 MD; 193/35 SS
(58) Field of Search .......................... 193/35 MD, 35 SS

(56) References Cited

U.S. PATENT DOCUMENTS

| | | | |
|---|---|---|---|
| 4,553,795 | * 11/1985 | Takagi | 193/35 MD |
| 4,627,526 | * 12/1986 | Masciarelli | 193/35 MD |
| 4,660,994 | * 4/1987 | Masciarelli | 199/35 MD |

FOREIGN PATENT DOCUMENTS

| | | |
|---|---|---|
| SHO 59-31410 B2 | 8/1984 | (JP) . |
| SHO 59-47614 B2 | 11/1984 | (JP) . |
| SHO 63-189422 | 12/1988 | (JP) . |

* cited by examiner

Primary Examiner—Joseph E. Valenza
(74) Attorney, Agent, or Firm—Duane, Morris & Heckscher LLP

(57) ABSTRACT

An apparatus for movably supporting an article includes a plurality of raising units arranged in a row on a mount, with their outer side surfaces contacting with those of adjacent ones. Each raising unit includes a lifting member including a piston and a ball disposed on top of the piston. A casing has a cylinder bore which is formed therein to open upward and in which the lifting member is disposed to be vertically movable. A pressure chamber is formed beneath the piston. A portion of the ball can protrude through the opening when the lifting member is raised. An air path extends from one to opposite side surfaces of the casing through the pressure chamber. When compressed air is supplied to the pressure chamber of the raising unit at one end of the row, it is also supplied to the pressure chambers of the remaining raising units.

27 Claims, 8 Drawing Sheets

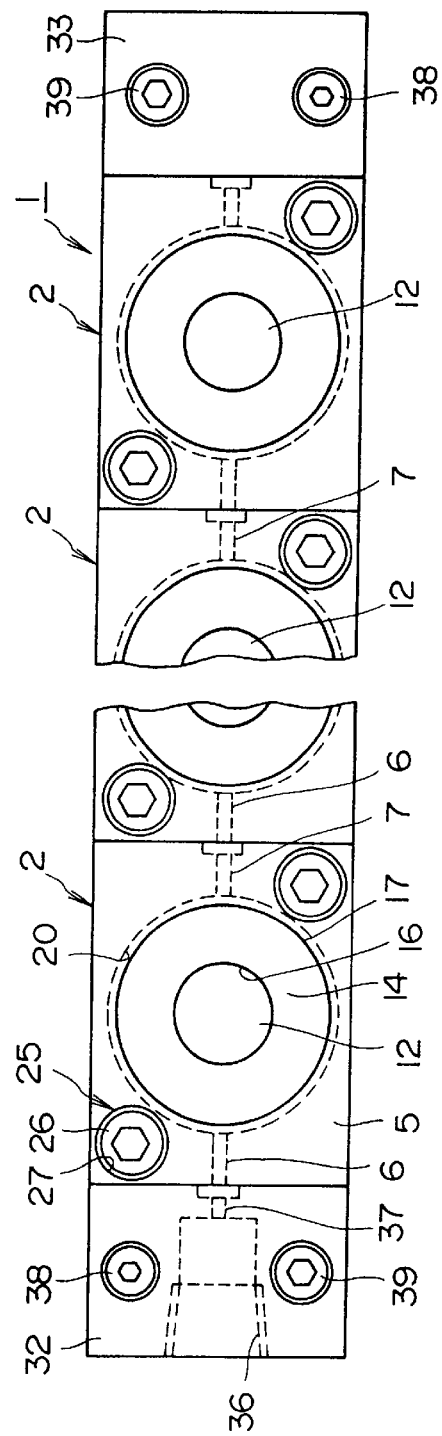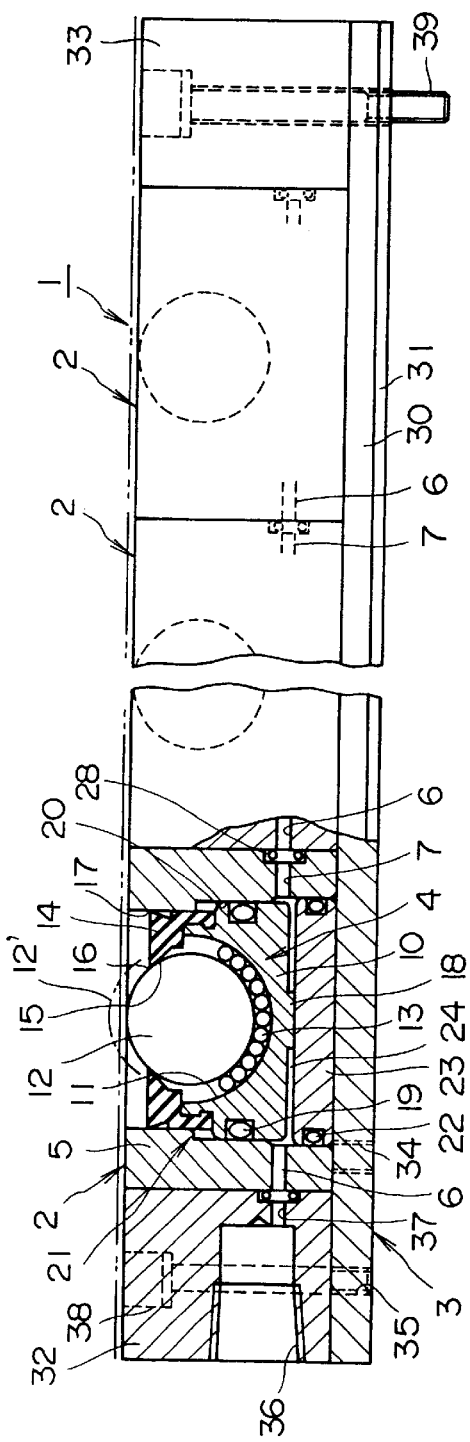

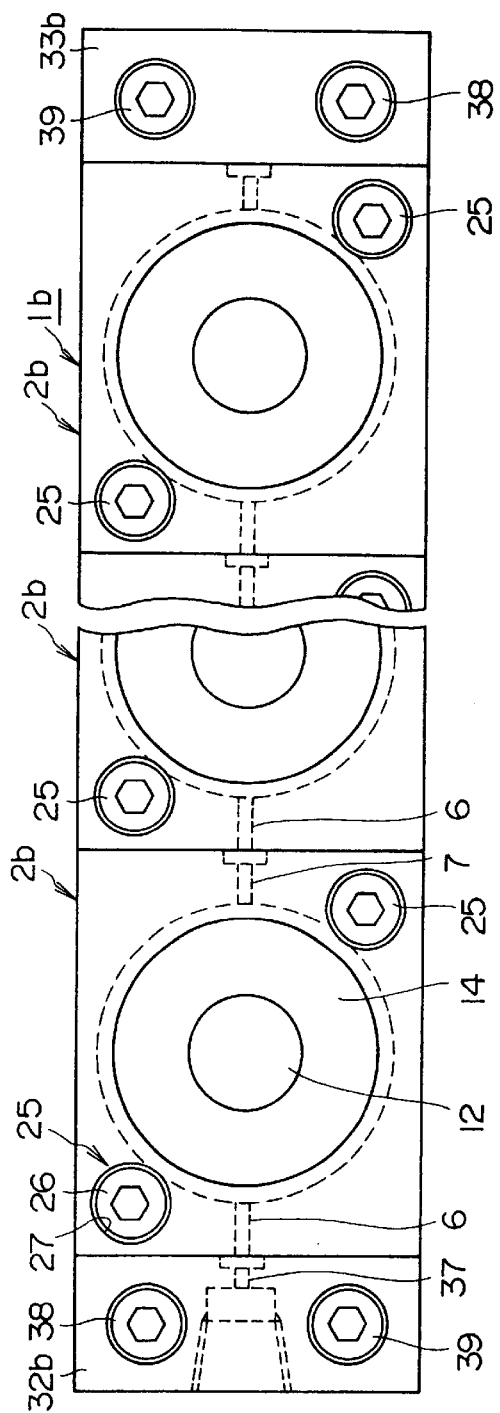
F I G. 3(a)
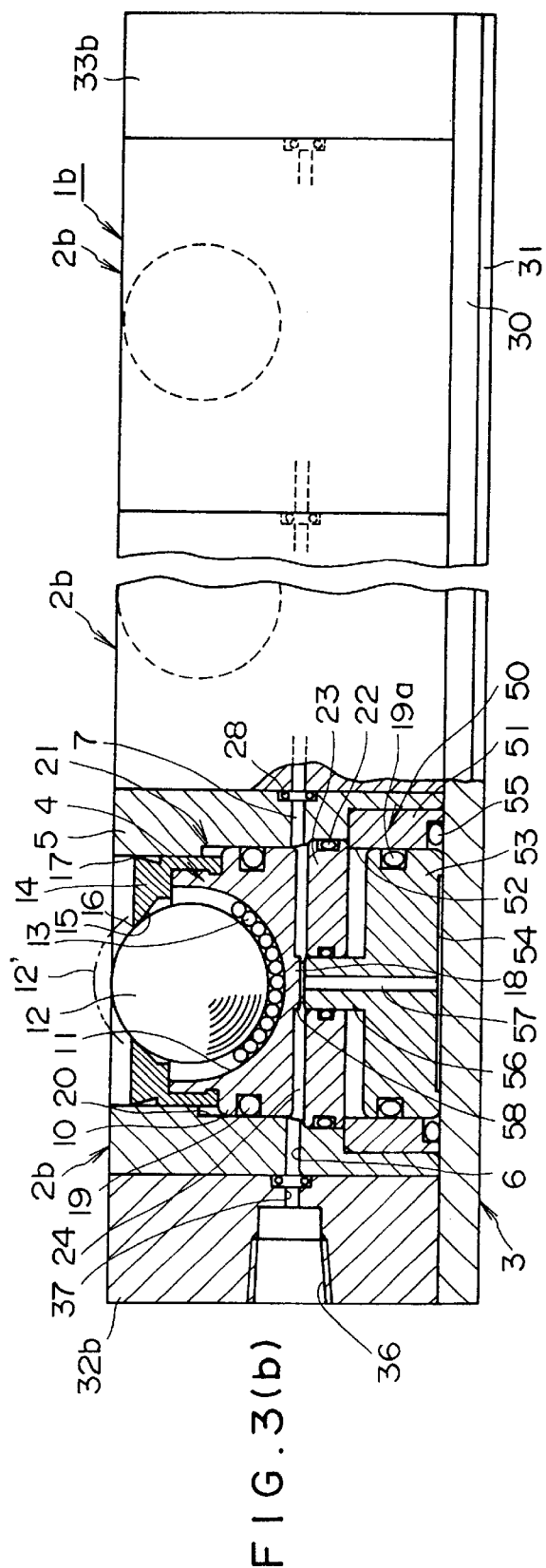
F I G. 3(b)

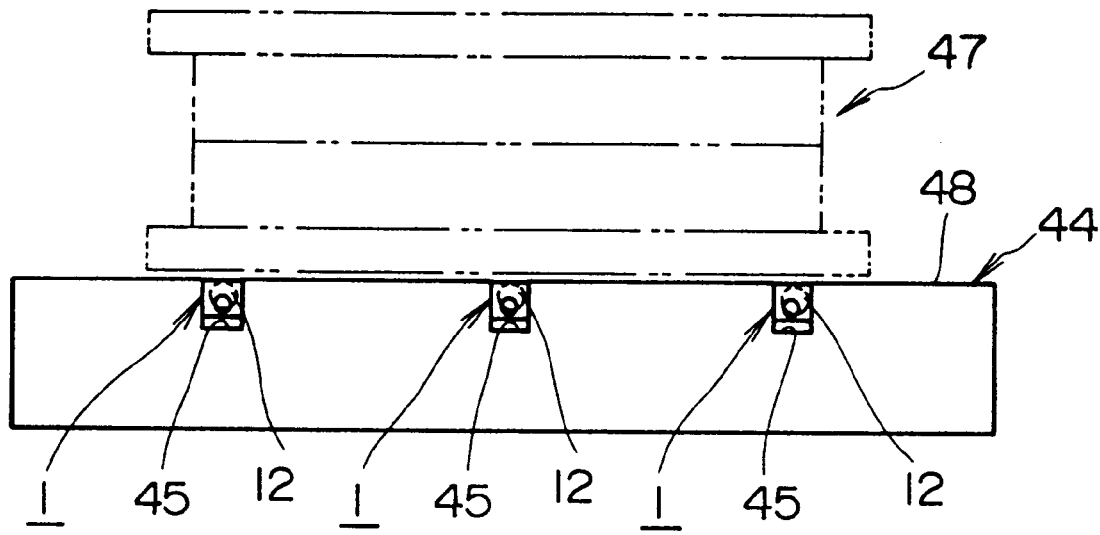
F I G. 6(a)
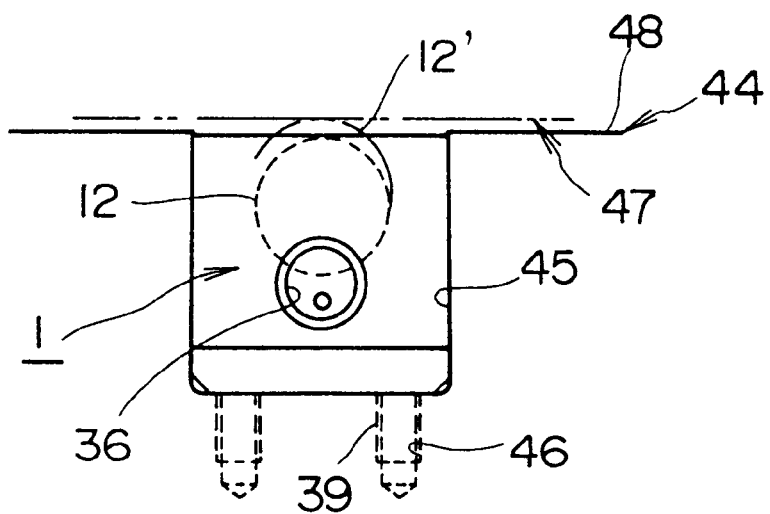
F I G. 6(b)

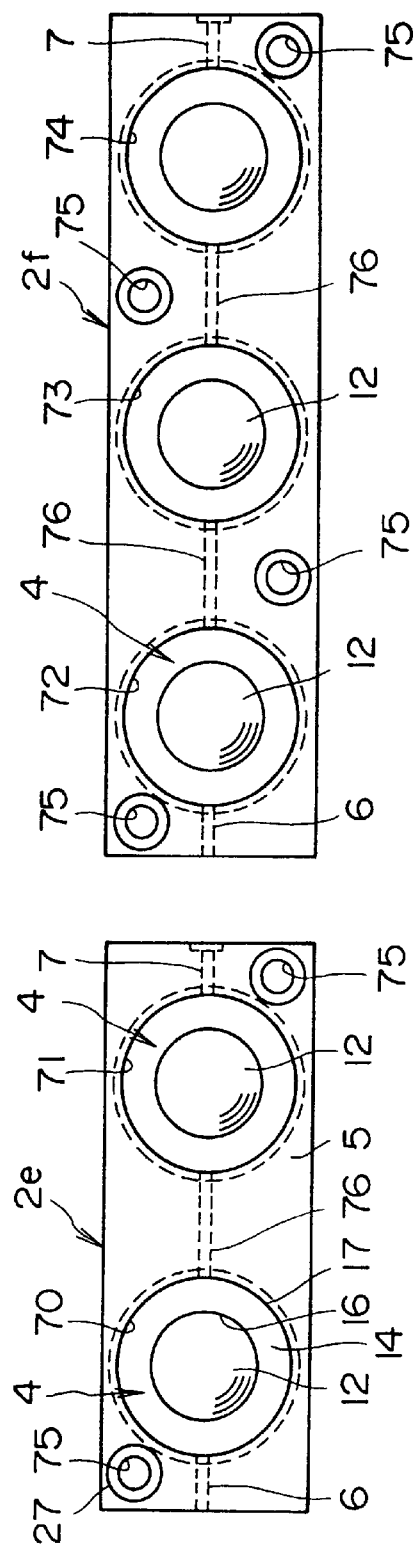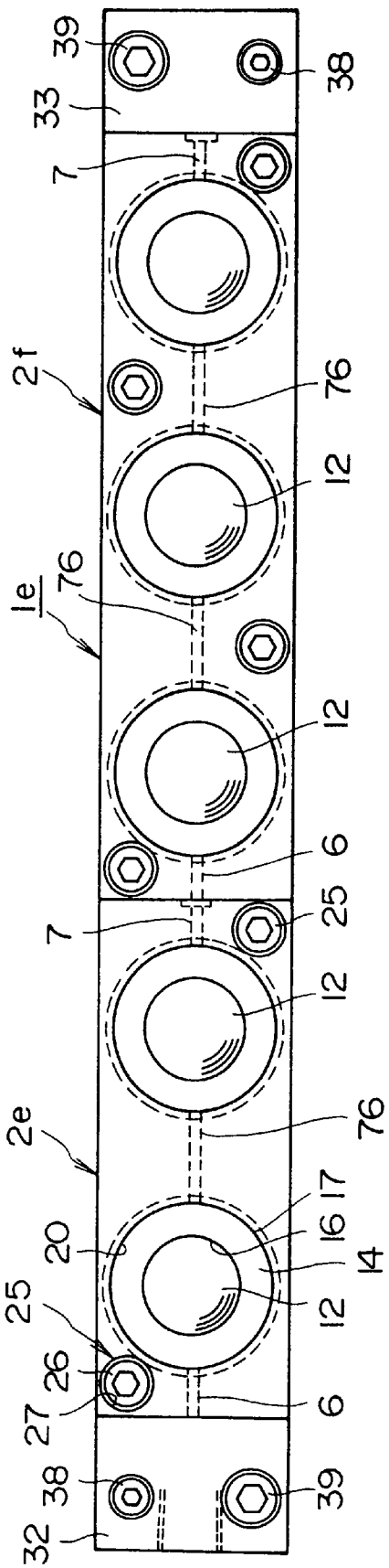

APPARATUS FOR MOVABLY SUPPORTING ARTICLE

This invention relates to an apparatus for movably supporting an article above a surface on which the article is to be rested, such as a die-supporting surface of a bolster of a press machine or a die carrier. The apparatus is placed with its upper surface positioned below the die-supporting surface, to raise an article above the die-supporting surface so that the article can be easily moved. When the article is relocated, the article supporting apparatus lowers the article on a new location.

BACKGROUND OF THE INVENTION

An apparatus for movably supporting an article is disclosed, for example, in Japanese Examined Patent Publication (KOKOKU) No. SHO 59-31410 published on Aug. 2, 1984, Japanese Examined Patent Publication (KOKOKU) No. SHO 59-47614 published on Nov. 20, 1984 and Japanese Unexamined UM Publication No. SHO 63-189422 published on Dec. 6, 1988. These publications disclose an article supporting apparatus which includes a bar to be disposed horizontally, and rollers or balls mounted in the bar. The rollers or balls are mounted in such a manner portions thereof protrude above the upper surface of the bar. The bar is raised by a plurality of hydraulic cylinder devices. Another example shown in these publications includes a bar having a plurality of vertical bores arranged in a row. A piston with a ball held on top of the piston is inserted in each of the bores, to provide a cylinder device. The pistons are raised to raise the balls on top of them. Both apparatuses are adapted to support a die on the rollers or balls. A plurality of such bars with the cylinder devices are mounted in a plurality of parallel T-shaped or U-shaped grooves formed in the upper surface of a bolster. By actuating the cylinder devices, the rollers or balls come into contact with the bottom surface of the die disposed on the upper surface of the bolster and raise the die above the upper surface of the bolster. Because rollers or balls support the die, it can be moved with ease.

Prior art apparatuses such as those described in the above-referenced Japanese publications use a bar of which the length corresponds to the depth or width of a bolster and which includes a plurality of rollers or balls or a bar with a plurality of cylinder devices. Therefore, when one or more parts of the apparatus break down, the entire bar including such broken parts must be removed for repair or replacement. Usually, a new bar is replaced in order to reduce the time necessary for repairing the apparatus so that the decrease of the operation efficiency of the press machine may be kept small. However, for ready replacement of a new bar, one or more bars having different lengths have to be stocked, so that the number of bars to be stocked is large. Furthermore, it is usual that the length of bars differs from one press machine to another, and, therefore, it is necessary to manufacture bars for a particular press machine only after a new order is given. Accordingly, it undesirably takes a long time for the ordered apparatus to be shipped.

The described type of article supporting apparatus is used to mount and remove a heavy press die onto and from a bolster, and, therefore, hydraulic cylinder devices are usually used to bear heavy weight. Because of the heavy weight of dies, pneumatic cylinder devices have been hardly used.

Therefore, an object of the present invention is to provide an apparatus for movably supporting an article which can be easily manufactured in a short time, for differing lengths required, and which can be pneumatically operated to support relatively heavy articles.

SUMMARY OF THE INVENTION

An apparatus for movably supporting an article according to the present invention includes a plurality of raising units and a mount on which the raising units can be mounted in a row with outer surfaces of adjacent ones of the raising units contacting each other.

Each of the raising units includes a vertically movable lifting member including a piston and a freely rotatable ball disposed on top of the piston, and a casing having a cylinder bore opening in the upper surface of the casing. The lifting member is disposed in the cylinder bore in a vertically movable manner so that at least a portion of the ball can protrude above the upper surface of the casing when the lifting member is in its elevated position. The casing includes a pressure chamber formed beneath the piston. An air path extends from one side surface of the casing to the opposing side surface through the pressure chamber. A plurality of such raising units are mounted on the mount in such a manner that the air path of one raising unit can communicate with the air paths of adjacent raising units. Compressed air is supplied to the pressure chamber at one end of the row of a plurality of raising units on the mount through the air path. The supplied compressed air is then supplied from the pressure chamber of the end raising unit to the pressure chambers of the remaining raising units in the row through the respective air paths.

The supporting apparatus with the above-described arrangement is disposed with its upper surface positioned slightly below a substantially horizontally extending article-resting surface on which an article to be movable supported by the apparatus is rested. For example, the supporting apparatus may be disposed in a horizontally extending groove formed in the article resting surface, with the balls of the respective raising units facing upward. Usually, at least two such supporting apparatuses are used and disposed in parallel with each other, but they may not be in parallel.

The mount may be a planar surface of any suitable flat surface at a level lower than the article resting surface, or it may be the bottoms of the respective grooves. Alternatively, the mount may be a separate member fixed to a suitable flat surface at a level lower than the article resting surface, or may be a member fixed to the bottoms of the respective grooves.

Compressed air is supplied to the pressure chamber of the first raising unit at one end of each row of the raising units, with the air path opening at the exposed side surface of the last raising unit at the other end of the row closed, so that the compressed air is supplied to the pressure chambers of the remaining raising units, which causes the lifting members to move to their elevated positions. As the lifting members move upward, the respective balls on top of the pistons abut against the bottom surface of an article disposed on the article resting surface to thereby lift the article. Alternatively, an article may be put on the balls of the respective lifting members in their elevated positions. Thus, the bottom surface of the article is raised from the article resting surface and can be moved in any desired direction in a plane along the article resting surface with a small force.

By discharging the compressed air from the pressure chamber of the first raising unit, the compressed air in the pressure chambers of the other raising units is also discharged, so that the article lifting force is removed. A vacuum apparatus is connected to evacuate the pressure chamber of the first raising unit, the pressure chambers of all the other pressure chambers are also evacuated, whereby the lifting members are lowered, and the article supported on the balls is placed on the article resting surface.

Thus, with the article supporting apparatus of the present invention, it is easy to carry articles to a desired location. Also, it is easy to change the position of an article.

Since the raising units of the article supporting apparatus according to the present invention are disposed adjacent to each other, and, therefore, the article supporting balls can be positioned close to each other. Accordingly, many balls can contribute to the supporting of the article, and, therefore, the apparatus can support a heavy-weighted article even when it is operated pneumatically.

An article supporting apparatus of any desired length can be prepared by connecting a corresponding number of the raising units.

Failure of the article supporting apparatus usually occur in one or more of the raising units. Accordingly, such failure can be removed by replacing one or more new raising units for malfunctioning raising units, instead of replacing the entire apparatus with a new one as done in prior art. Thus, the time required for repair can be reduced.

Each of the raising unit may include a vertically movable lifting member including a first piston and a freely rotatable ball disposed on top of the first piston, and a double-cylinder casing including a first cylinder section and a second cylinder section formed beneath the first cylinder section. The first cylinder section has a first cylinder bore opening in the upper surface of the casing. The lifting member is disposed in the first cylinder bore in a vertically movable manner so that at least a portion of the ball can protrude above the upper surface of the casing when the lifting member is in its elevated position. The first cylinder section also includes a first pressure chamber formed beneath the first piston. The second cylinder section is supplied with a pneumatic pressure from the first pressure chamber, to thereby provide a lifting force to be added to the lifting force of the first piston. The casing is provided with an air path extending from one side surface of the casing through the first pressure chamber to the other opposite side surface. The air path of one raising unit is connected to that of adjacent ones when a plurality of raising units are mounted on the mount.

Compressed air is supplied to the first pressure chamber of the first raising unit at one end of the row of a plurality of raising units through the air path. The supplied compressed air is then supplied from the first pressure chamber of the first raising unit to the first pressure chambers of the remaining raising units in the row through the respective air paths.

The article supporting apparatus with the above-described double-cylinder type raising units is used in substantially the same manner as the first described one. Because of the double-cylinder configuration, the output force is twice that of a single-cylinder type apparatus. In addition, since the lifting stroke of the lifting member of an article supporting apparatus can be short in many applications, the height of the double-cylinder type raising unit can be the same as that of the single-cylinder type unit. Accordingly, the output lifting force twice that of a single-cylinder type raising unit can be obtained without deepening the grooves.

The mount is desirably an elongated plate. Before the supporting apparatus is disposed at a desired position, the raising units are mounted on the elongated mounting plate into a single assembly. Accordingly, the supporting apparatus can be easily fixed in position by simply securing the mounting plate. Since the article supporting apparatus can be formed by mounting raising units on the elongated plate which can be easily manufactured. Thus, by storing a reasonable number of raising units, an article supporting apparatus of a desired length can be readily manufactured by using such stored units. In other words, when an apparatus of any length is ordered, a mounting plate having a length corresponding to the ordered apparatus is manufactured, and a required number of raising units in storage are mounted on the manufactured mounting plate. Thus, supporting apparatus of any desired length can be easily manufactured in a shorter time.

The second cylinder section may include a second cylinder bore separated from the first cylinder bore by the bottom wall of the pressure chamber, and a second piston disposed in the second cylinder bore in such a manner as to provide a second pressure chamber beneath the second piston. The second cylinder section further includes a piston rod extending upward from the second piston hermetically and slidably through the bottom wall of the first pressure chamber. The piston rod of the second piston abuts against the bottom surface of the first piston. A communication path extending through the piston rod of the second piston makes the first and second pressure chambers communicate with each other.

In other example, the piston rod of the second piston may interconnect the second piston and the first piston. With this arrangement, the upper limit of the upward movement of the lifting member can be determined by limiting the upper limit of the upward movement of the second piston because the first and second pistons are connected together. This arrangement, therefore, eliminates the need for providing upward movement limiting means for the first piston.

The second cylinder bore may be formed in the elongated mounting plate.

Upward movement limiting means may be provided for so determining the uppermost position of the first piston that the ball be protrude above the upper surface of the casing by a predetermined amount. With this arrangement, when compressed air is supplied to the respective pressure chambers of the raising units, and an article is lifted by the balls, all of the balls are at substantially the same elevated level regardless whether they are abutting the bottom surface of the article or not. Accordingly, when the article is moved, the bottom surface of the article can smoothly ride and move on those balls which have not been contacted it, which reduces wear of the balls.

The upward movement limiting means may be provided by reducing the inner diameter of the upper portion of the first cylinder bore. The first piston engages with the smaller diameter portion of the first cylinder bore, so that its upward movement is restricted.

The upward movement limiting means may be a larger diameter portion provided in a piston rod extending from the bottom of the first piston slidably and hermetically through the bottom wall of the first pressure chamber beyond the lower surface of the bottom wall of the first pressure chamber. The upward movement of the lifting member stops when the larger diameter portion of the piston rod of the first piston abuts against the lower surface of the bottom wall of the first pressure chamber. For the double cylinder configuration, the larger diameter portion can be the second piston, so that it can functions as the upward movement limiting means as well as the second piston.

The casing may have a shape of a rectangular parallelepiped. Then, when a plurality of raising units with a casing of such shape are arranged on the mount, an article supporting apparatus having a horizontally elongated regular tetrahedral prism shape results. Accordingly, no gap can be formed between the upper portions of the raising units and the groove through which foreign matters would otherwise enter into the groove. In addition, since the cylinder bore is usually circular, through holes through which screws for fixing the casing to the mount extend can be formed at corners, which facilitates the mounting of the raising units close to each other.

The raising unit may be provided with a ball holder of synthetic resin. The ball holder has its lower edge engaging with the first piston and has its upper portion covering the ball on top of the first piston. The upper portion has a circular opening therein in its center through which a portion of the ball protrudes. The ball holder has such an outer peripheral surface as to slidably fit into the upper portion of the first cylinder bore. The upper surface of the ball holder is flat. The outer peripheral edge of the ball holder and the peripheral edge of the circular opening form dust seals, which prevent foreign matters from entering into the space between the inner surface of the first cylinder bore and the outer peripheral surface of the ball cover, and into the inside of the ball cover where the ball is disposed. The material for the ball cover may preferably be a resin exhibiting a low friction coefficient in relation to the ball, e.g. polyamide plastics (nylon) and fluoroplastics (Teflon).

The raising unit may include a casing with two or three lifting members with respective balls. Thus, the article supporting apparatus having a desired number of balls or lifting members can be formed by combining a required number of raising units which include one, two or three lifting members. This can reduce the number of raising units to be used and, therefore, make it easy to assemble and install article supporting apparatuses requiring a large number of raising units. It might be possible to prepare a raising unit having four or more lifting members. However, in such a case, even if only one lifting member of a raising unit fails to operate, that raising unit must be removed for replacement, with the remaining three or more well-operating lifting members being sacrificed. Accordingly, the number of lifting members in one raising unit may be preferably not greater than three.

BRIEF DESCRIPTION OF THE DRAWINGS

FIGS. 1(a) and 1(b) are plan and partially cross-sectional front views, respectively, of a part of an article supporting apparatus according to a first embodiment of the present invention.

FIGS. 3(a) and 3(b) are plan and partially cross-sectional front views, respectively, of a part of an article supporting apparatus according to a third embodiment of the present invention.

FIGS. 6(a) and 6(b) show how the article supporting apparatuses shown in FIGS. 1(a) and 1(b) and in FIGS. 2(a) and 2(b) can be used.

FIG. 7 is a plan view of one raising unit according to a sixth embodiment of the present invention.

FIG. 8 is a plan view of one raising unit according to a seventh embodiment of the present invention.

FIG. 9 is a plan view of an article supporting apparatus including one raising unit shown in FIG. 7 and one raising unit shown in FIG. 8.

DETAILED DESCRIPTION OF EMBODIMENTS

Figure 2A:
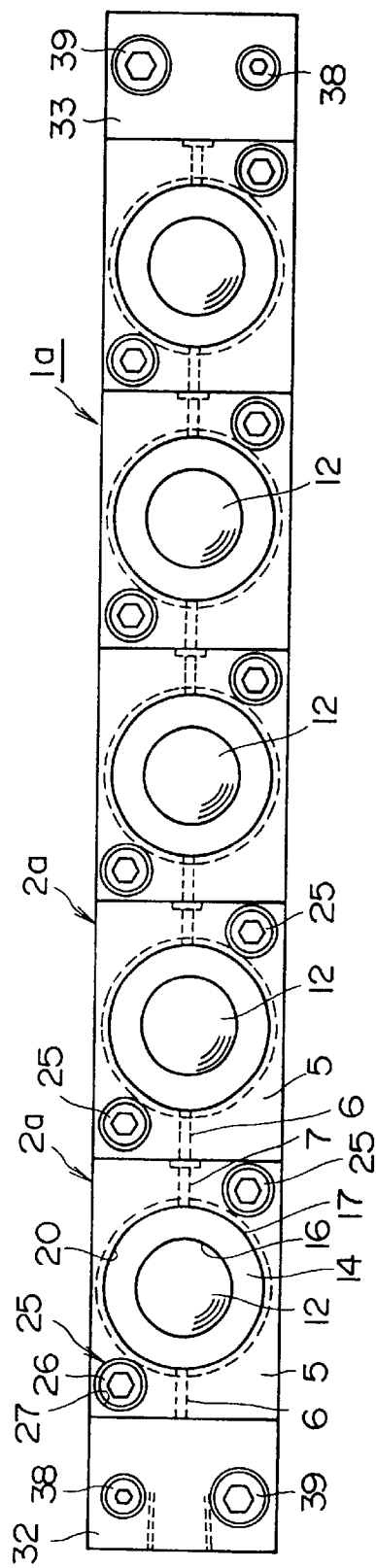
FIGS. 2(a) and 2(b) are plan and partially cross-sectional front views, respectively, of an article supporting apparatus according to a second embodiment of the present invention.

An article supporting apparatus 1 according to a first embodiment of the present invention is shown in FIGS. 1(a) and 1(b). The apparatus 1 includes a plurality of raising units 2 and a mount 3 on which the raising units 2 are mounted in a row. Each raising unit 2 includes a lifting member 4, a casing 5, an inlet air path 6 and an outlet air path 7. Since all of the raising units 2 have the same structure, only one of the raising units, namely, the leftmost or first raising unit, is described.

As shown in FIG. 1(b), the lifting member 4 of the raising unit 2 includes a piston 10, and a ball 12 disposed in a bowl 11 formed in the top surface of the piston 10. A large number of small balls 13 are interposed between the ball 12 and the inner surface of the bowl 11 so that the ball 12 can freely rotate.

A ball holder 14 made of a plastic material, e.g. nylon, is attached to the piston 10 and covers the ball 12 to prevent it from dropping off from the bowl 11. The lower end of the ball holder 14 has a peripheral ridge projecting inward, which fits in a circular groove formed in the upper portion of the piston 10 so that the ball holder 14 will not disengaged from the piston 10 within a later-mentioned cylinder bore 20.

The ball holder 14 has a round through-hole 15 formed in a center portion of the flat upper surface, through which a portion of the ball 12 protrudes. The outer peripheral surface of the ball cover 14 fits in the upper portion of the cylinder bore 20 in a vertically slidable manner.

The edge defining the round hole 15 has a tapered cross-section, and, also the outer peripheral edge of the ball cover 14 has a tapered cross-section, whereby dust seals 16 and 17 are provided, respectively.

The piston 10 itself is generally disc-shaped and carries the ball 12 on top of it. A rising 18 low in height protrudes downward from the bottom surface of the piston 10. The piston 10 has a circular groove in its outer peripheral surface, in which an O-ring 19 is disposed.

The casing 5 is a block of, for example, steel, of a rectangular parallelepiped shape, and the vertically extending cylinder bore 20 is formed through the center portion of the block. The cylinder bore 20 has a smaller diameter portion 21 in its upper portion, and the piston 10 moves up and down in the cylinder bore portion below the smaller diameter portion 21. Thus, the smaller diameter portion 21 functions as upward movement limiting means to prevent the piston 10 from moving further upward and, thus, slipping off from the upper opening of the cylinder bore 20. The ball cover 14 moves in the smaller diameter portion 21, with the dust seal 17 intimately contacting the inner surface of the portion 21. It is so arranged that when the piston 10 moves to the upper limit position, the upper end of the dust seal 17 is close to but not beyond the upper end surface of the casing 5.

The lower end of the cylinder bore 20 is closed by a disc-shaped bottom wall member 23 snugly fitting the cylinder bore 20 with an O-ring 22 interposed. Thus, a pressure chamber 24 is formed between the bottom wall member 23 and the piston 10.

As shown in FIG. 1(a), vertically extending through-holes are formed in the casing 5 at diagonally opposite corners, and hexagonal-socket headed bolts 25 are inserted into the respective through-holes for securing the raising unit 2 to a mounting plate member 30 described later, with their heads 26 resting in respective spot facings 27.

The air paths 6 and 7 extend from the respective ones of the two side surfaces of the casing 5 to the pressure chamber 24. They open in the respective opposite side surfaces at the same level so that, then two raising units are arranged side by side with their top surface positioned at the same level, the air path 7 of one raising unit is aligned with the air path 6 of the other raising unit. A larger diameter portion is formed in the outer end portion of the air path 7, in which an O-ring 28 is placed to hermetically seal at the connection of the air paths 6 and 7.

As shown in FIG. 1(b), the mount 3 includes an elongated mounting plate member 30 having a thickness, and has a width same as the width of the casing 5. The plate member 30 has such a length that a given number of raising units 2 can be mounted on its upper surface in a row with the adjacent side surfaces contacting each other, and that end members 32 and 33, which are in the form of block, can be mounted at opposite ends of the row of the raising units 2. Bevels 31 are formed along the lower longer edges of the plate member 30, to prevent the lower longer edges from interfering with corners of a groove in an article supporting surface.

The plate member 30 has two screw holes 34 for each of the casing 5. Also, it has one screw hole 35 for each of the end members 32 and 33 for securing each end member to the mounting plate member 30. Each of the end members 32 and 33 are secured with their side surfaces contacted with the open side surfaces of the raising units 2 at the opposite ends of the row.

Specifically, the end member 32 has an air-tube connecting section 36 and an air path 37 which is connected with the air-tube connecting section 36 and with the air path 6 of the raising unit 2 (hereinafter referred to as first raising unit 2) at one end of the row of raising units mounted on the mount 3. Compressed air is supplied to and discharged from the air path 6 through the air-tube connecting section 36. The other end member 33 has a flat side surface free of holes so that it can close the air path 7 of the raising unit 2 (hereinafter referred to as last raising unit 2) at the other end of the row.

FIGS. 1(a) and 1(b) show how a given number of raising units 2 are mounted on the mount 3 or mounting plate member 30 together with the end members 32 and 33. Each of the end members 32 and 33 has two screw holes extending therethrough. A screw 38 is inserted into one of the screw holes and screwed into the screw hole 35 in the plate member 30, and a screw bolt 39 is inserted into the other screw hole and extends beyond the bottom surface of the plate member 30 for securing the supporting apparatus at a given mounting position, for example, the bottom of the groove in the supporting surface. The end of the screw bolt 39 is screwed into a screw hole in the groove bottom.

When the raising units 2 and the end members 32 and 33 are mounted on the mounting plate member 30, the air path 6 of an intermediate raising unit is in communication with the air path 7 of the preceding raising unit, the air path of the first raising unit 2 is connected to the air path 37 in the end member 32, and the air path 7 of the last raising unit 2 is closed by the other end member 33.

Also, because the bottom of each raising unit 2 is in contact with the plate member 30, the bottom wall member 23 closing the cylinder hole 20 does not slip off.

Figure 2B:
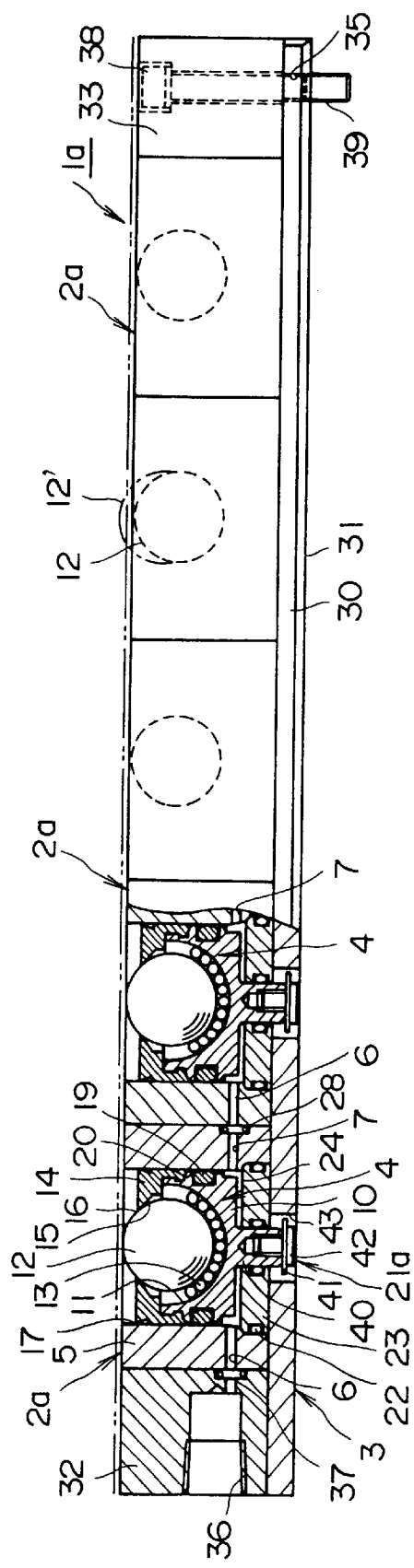

FIGS. 2(a) and 2(b) show an article supporting apparatus 1a according to a second embodiment of the present invention.

The apparatus 1a differs from the apparatus 1 shown in FIGS. 1(a) and 1(b) only in the structure of the upward movement limiting means. Accordingly, the following description is directed chiefly to the upward movement limiting means 21a. The remaining components are not described specifically, but the same reference numerals are attached to them as used in FIGS. 1(a) and 1(b).

The upward movement limiting means for the lifting member 4 shown in FIGS. 1(a) and 1(b) includes a piston rod 40 which extends downward from the lower surface of the piston 10 hermetically and slidably through the bottom wall member 23 of the pressure chamber 24, and a disc 41 having a larger diameter than the piston rod 40. The disc 41 is secured to the lower end of the piston rod 40 by a screw 42. Since the lower end of the piston rod 40 with the disc 41 is located beneath the bottom wall member 23, a round hole 43 is formed in the mounting plate member 30 so as to receive the lower end of the piston rod 40 and the disc 41.

FIG. 6 exemplifies how to use the article supporting apparatuses 1 and 1a shown in FIGS. 1(a) and 1(b) and FIGS. 2(a) and 2(b), respectively. The article supporting apparatus 1 or 1a may be placed in a groove 45 having a generally rectangular cross-section which is formed in the upper surface of a bolster 44 of a press machine. Since both apparatuses 1 and 1a are used in the same manner, only the manner how to use the article supporting apparatus 1 is described. The screw bolts 39 are screwed into screw holes 46 in the bottom surface of the groove 45. In the example illustrated in FIG. 6, three such article supporting apparatus 1 are placed in respective ones of three such grooves 45 spaced from each other. Raising units 2 are arranged in a row extending along the substantially entire length of each groove 45. An air tube (not shown) is connected to the air-tube connecting section 36 of each supporting apparatus 1. Compressed air under a predetermined pressure is supplied to all the pressure chambers 24 of the raising units 2 through the air-tube connecting section 36 and the air path 37 in the end member 32 and the air paths 6 and 7. This causes the lifting members 4 of all of the raising units 2 of the three supporting apparatuses to be raised, whereby the respective balls 12 project upward beyond the upper surface of the bolster 44, as indicated by a phantom line circle 12', as also shown in FIGS. 1(b) and 2(b).

A set of upper and lower dies 47 are placed on the rows of the projecting balls 12, so that they can be moved with a small force in any desired direction since they are supported on the freely rotatable balls. After the dies 47 are moved to a desired position, the compressed air in the respective pressure chambers 24 is discharged, which causes the balls 12 together with the associated pistons 10 to be lowered. Thus, the dies 47 rest on the bolster 44 at the desired location. Now, the upper and lower dies 47 are ready to be secured to the bolster 44 and an upper slide.

For substituting a new die set for the die set 47, the die set 47 is unclamped, and compressed air is supplied to the respective pressure chambers 24 to raise the lifting members 4, which causes the die set 47 to be freely movable on the balls 12. The die set 47 is moved out of the bolster 44, and the new dies are placed on the raised balls 12 and moved on the balls 12 to a desired location. After that, the compressed air is discharged from the pressure chambers 24 to lower the lifting members 4 and, hence, the new die set. Then, the new die set is secured.

The article supporting apparatuses 1 and 1a are pneumatically operated, and, therefore, the output force of an individual cylinder or lifting member 4 may be smaller than a hydraulic cylinder. However, the force provided by the apparatus as a whole is large enough to raise and support dies.

For a larger output force, a double-cylinder structure described below may be used, which can provide an output force substantially twice the single-cylinder type apparatus described above.

FIGS. 3(a) and 3(b) show an article supporting apparatus 1b according to a third embodiment of the present invention, which differs from the apparatus 1 shown in FIGS. 1(a) and 1(b) in that each raising unit 2b is of a double-cylinder structure. The casing 5 includes a second cylinder section 50 disposed coaxial with the cylinder bore 20 below the pressure chamber 24.

The casing 5 of the article supporting apparatus 1b is longer than that of the apparatus 1 shown in FIGS. 1(a) and 1(b), and the second cylinder section 50 is formed in the lower part of the extended casing 5. The second cylinder section 50 includes a cylindrical member 51 positioning the bottom wall member 23 in place and having a bore therethrough which provides a second cylinder bore 52. A second piston 53 is disposed within the second cylinder bore 52. The lower opening of the second cylinder bore 52 is closed by the mounting plate member 30, to thereby form a second pressure chamber 54 beneath the second piston 53. An O-ring 55 is disposed for the second pressure chamber 54, and an O-ring 19a is disposed for the second piston 53.

The second piston 53 has a second piston rod 56 protruding upward form its top surface. The second piston rod 56 hermetically and slidably extends through the bottom wall member 23 and abuts against the rising 18 on the bottom surface of the first upper piston 10. The second pressure chamber 54 is supplied with compressed air through the first pressure chamber 24. The second pressure chamber 54 and the first pressure chamber 24 are in communication with each other through an air path 57 formed to extend vertically centrally through the second piston 53 and the second piston rod 56, and a diametrically extending groove 58 formed in the top surface of the second piston rod 56 to communicate with the air path 57.

Since the vertical dimension of the casing 5 is larger by the amount corresponding to the dimension of the second cylinder section 50, end members 32b and 33b corresponding to the end members 32 and 33 also have an accordingly larger vertical dimension.

The remaining parts of the article supporting apparatus 1b are substantially the same as those of the apparatus 1 shown in FIGS. 1(a) and 1(b), and, therefore, no description is made here about them, but the same reference numerals as used in FIGS. 1(a) and 1(b) are attached to them.

Figure 4:
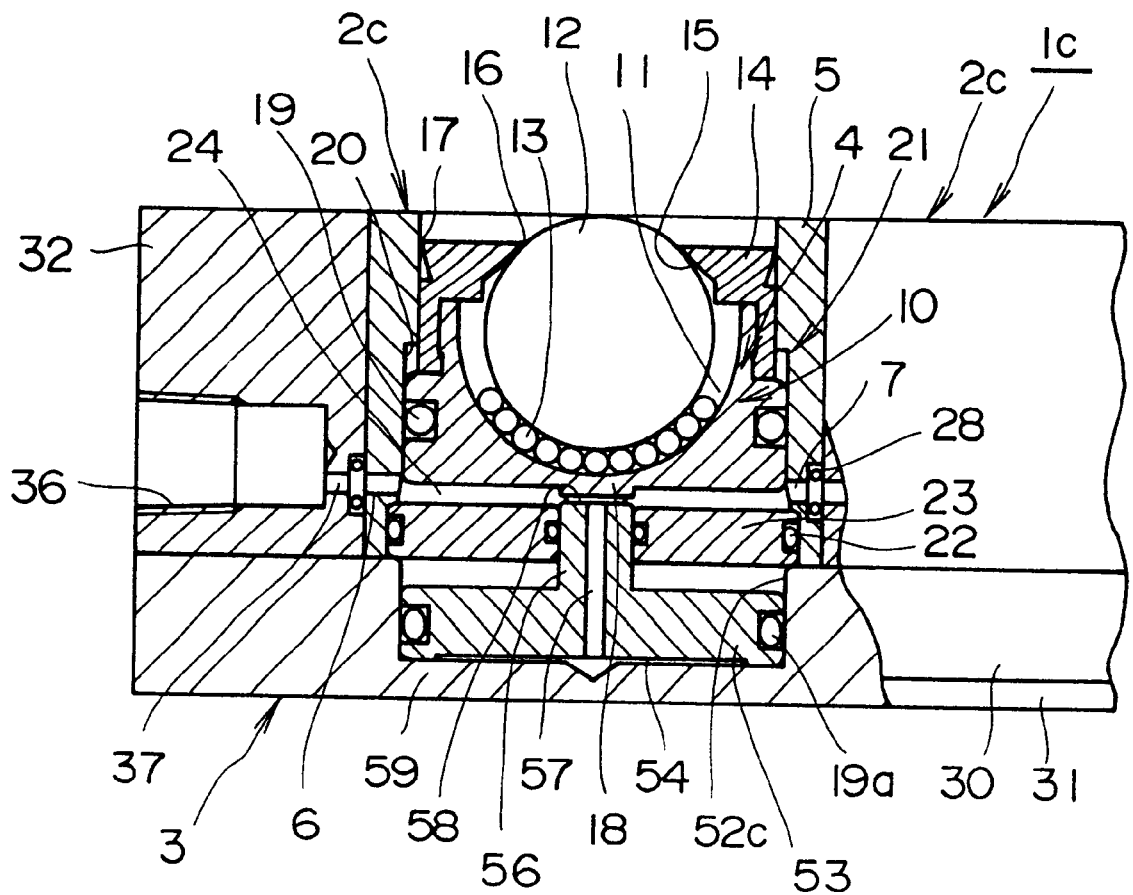
FIG. 4 is a partial cross-sectional front view of a part of an article supporting apparatus according to a fourth embodiment of the present invention.

FIG. 4 shows an article supporting apparatus 1c according to a fourth embodiment of the present invention, which includes raising units 2c. The article supporting apparatus 1c is of a double-cylinder structure like the apparatus 1b shown in FIGS. 3(a) and 3(b), but it differs from the apparatus 1b in that its second cylinder bore 52c of each raising unit 2c is formed in the mounting plate member 30.

The second cylinder bore 52c is formed in the mounting plate member 30 and opens upward. The second cylinder bore 52c is closed by a bottom wall 59, which is a part of the mounting plate member 30. The second piston 53 is disposed in this second cylinder bore 52c, and the second pressure chamber 54 is provided beneath the second piston 53. The remaining parts of the article supporting apparatus 1c are the same as the apparatus 1b shown in FIGS. 3(a) and 3(b), and, therefore, no further description is made about them. The same reference numerals as used in FIGS. 3(a) and 3(b) and FIGS. 4(a) and 4(b) denote similar components or functions.

Figure 5A:
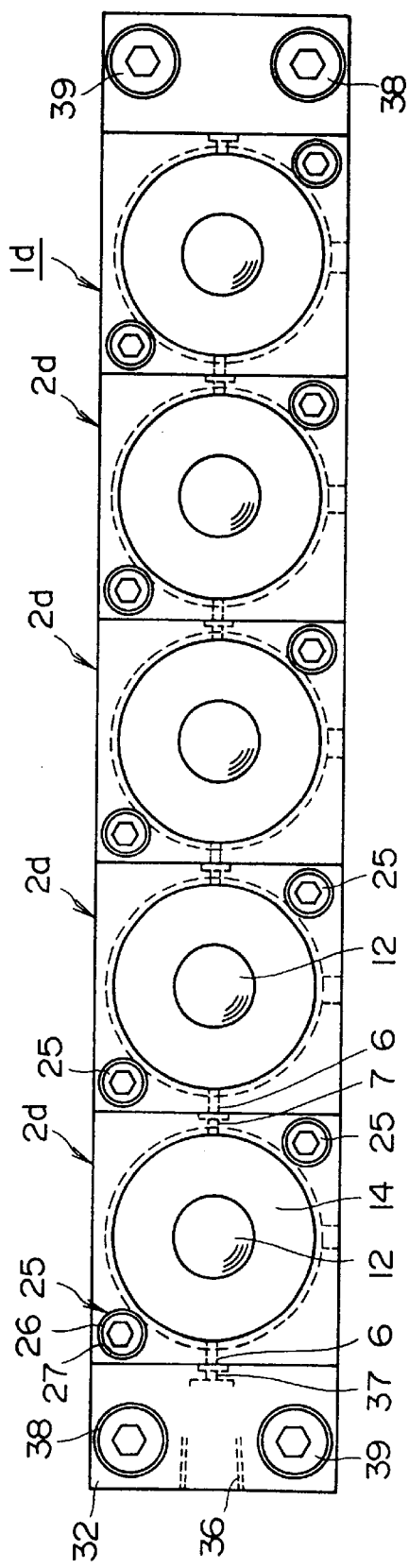
FIGS. 5(a) and 5(b) are plan and partially cross-sectional front views, respectively, of an article supporting apparatus according to a fifth embodiment of the present invention.
Figure 5B:
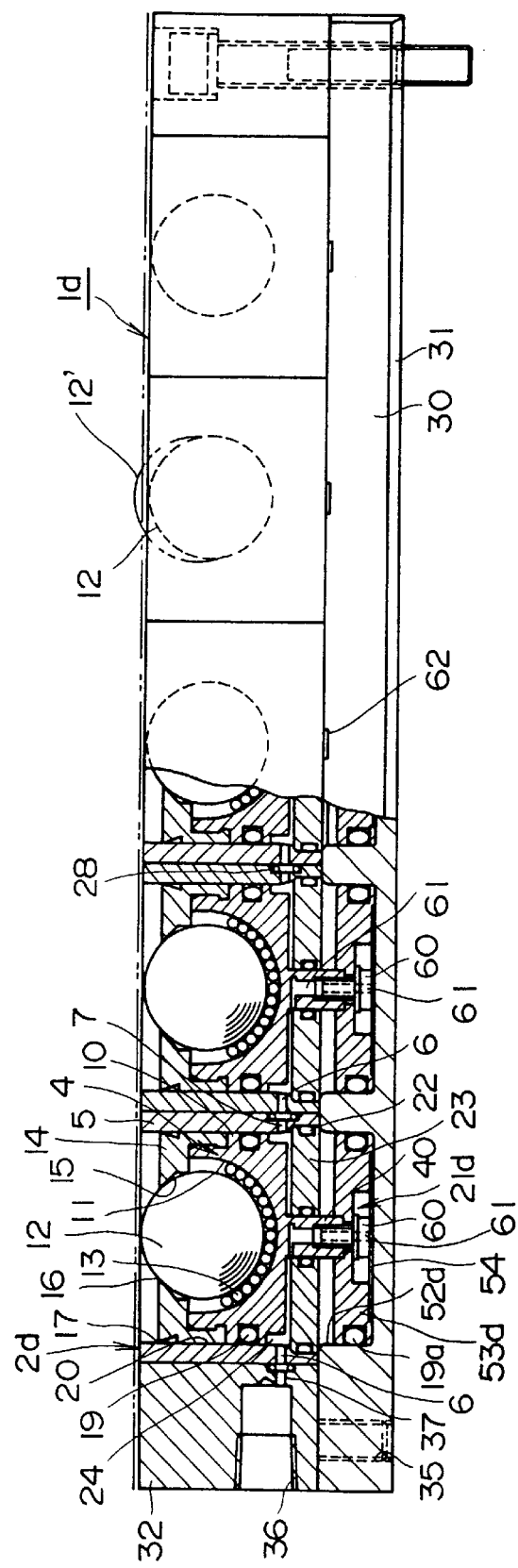

FIGS. 5(a) and 5(b) show an article supporting apparatus 1d according to a fifth embodiment of the present invention, which has a structure similar to that of the apparatus 1c shown in FIG. 4 in that each raising unit 2d is of a double-cylinder structure and a second cylinder bore 52d is formed in the mounting plate member 30. However, it differs in the structure of the upward movement limiting means for setting the upper limit of movement of the piston 10. The upward movement limiting means 21d has a similar structure as the upward movement limiting means 21a of the apparatus according to the second embodiment shown in FIGS. 2(a) and 2(b), but it does not include the larger diameter disc 41 disposed at the lower end of the piston rod 40 of FIGS. 2(a) and 2(b). A second piston 53d corresponding to the piston 53 of the fourth embodiment performs the function of the disc 41, too. Therefore, the second piston 53d and the piston rod 40 are secured to each other by a headed screw 60. An air path 61 is provided to extend through both of the piston rod 40 and the screw 60 so that the second pressure chamber 54 and the upper first pressure chamber 24 are interconnected, and, thus, compressed air can be supplied to and discharged from the second pressure chamber 54 through the air path 61. As shown in FIG. 5(b), a respiratory hole 62 is formed for the upper space which is formed above the second piston 53d when it is in the lower position. When the piston 53d moves up and down, air within the space is discharge from and supplied to through the respiratory hole 62. Although neither mentioned nor shown for the article supporting apparatuses 1b and 1c, a similar respiratory hole is provided.

The remaining portions of the apparatus 1d are similar to those of the apparatus 1c shown in and described with reference to FIG. 4, no description is made. The same reference numerals are used for similar components and functions.

Figure 10:
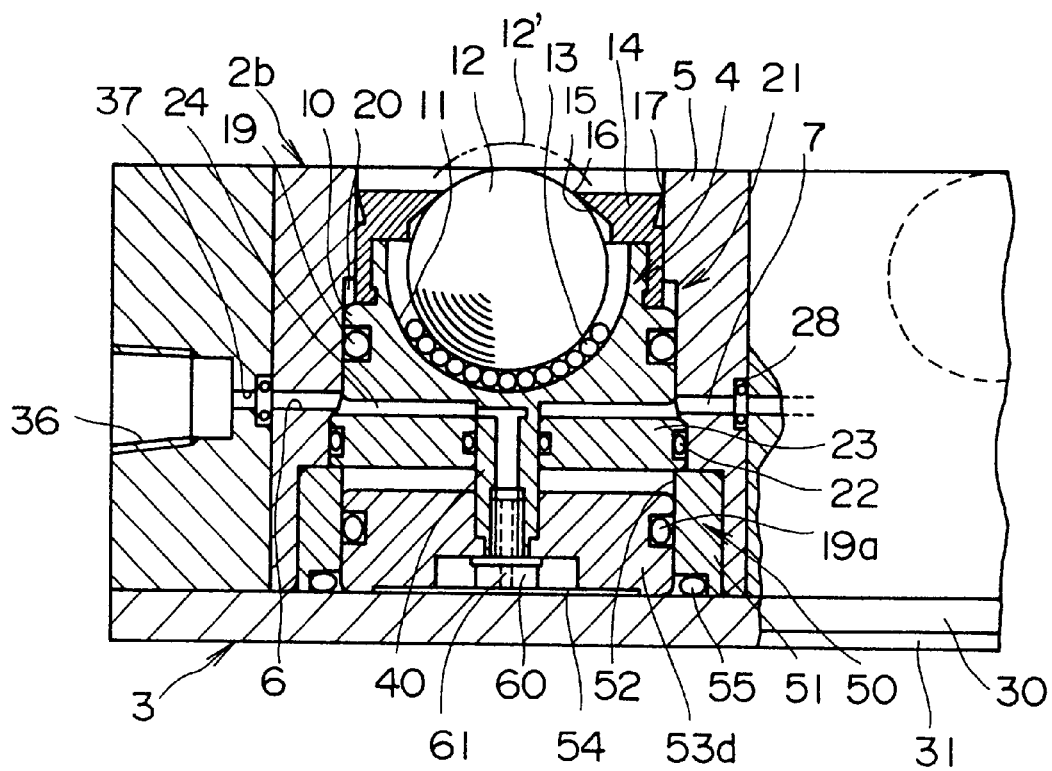
FIG. 10 is a partially cross-sectional front view of a modification of the apparatus shown in FIGS. 5(a) and 5(b).

In the article supporting apparatus shown in FIGS. 5(a) and 5(b), the second cylinder bore 52d is formed in the mounting plate member 30. However, as shown in FIG. 10, the second cylinder bore 52d may be formed in the casing 5 instead of the mounting plate member 30, as in the case of the apparatus shown in FIGS. 3(a) and 3(b). The same reference numerals used in FIGS. 3(a) and 3(b) and FIGS. 5(a) and 5(b) are used also for the components of the apparatus shown in FIG. 10, since their functions the same as those of the components shown in FIGS. 3(a) and 3(b) and FIGS. 5(a) and 5(b).

In each of the article supporting apparatuses 1b, 1c and 1d, the upper first pressure chambers 24 and the lower second pressure chambers 54 of all of the raising units 2b, 2c or 2d are in communication with each other through the air paths 6 and 7 and the air paths 57, 58 in case of the apparatuses 1b and 1c or the air paths 61 in case of the apparatus 1d.

These article supporting apparatuses are used in the same manner as the article supporting apparatus 1 or 1a. For example, for the use with the press machine bolster 44 shown in FIGS. 6(a) and 6(b), a plurality of such apparatuses are mounted in the grooves 45, and compressed air is supplied through the air-tube connecting section 36 and the air path 37 in the end member 32 and the air paths 6 and 7 in the first raising unit 2b, 2c or 2d. This causes the lifting members 4 of all of the remaining raising units 2b, 2c or 2d to move upward, whereby all the balls 12 protrude above the upper surface 48 of the bolster 44, as indicated by the phantom line circle 12'. Accordingly, the dies 47 supported on the balls 12 can be moved easily to a desired location. As the compressed air is discharged, the lifting force is removed from the respective lifting members 4, and, therefore, the dies 47 on the balls 12 is placed on the upper surface of the bolster 44. The force with which each ball 12 raises the dies 47 is the sum of the force provided by the first piston 10 and the force provided by the second piston 53. If the outer diameters of the first and second pistons 10 and 53 are substantially the same, the force with which the article or dies 47 is raised is approximately twice the force provided by the raising unit 2 or 2a which includes only the first piston 10. Accordingly, in addition to because many raising units 2b, 2c or 2d are disposed close to each other, because the raising units are of the double-cylinder structure, relatively heavy dies can be lifted and supported by the article supporting apparatuses 1b, 1c and 1d.

Article supporting apparatuses according to other embodiments of the present invention are described with reference to FIGS. 7, 8 and 9. The apparatus according to a sixth embodiment of the present invention includes one or more raising units 2e shown in FIG. 7, each having two lifting members 4 disposed in two cylinder bores 70 and 71, respectively. The apparatus according to a seventh embodiment includes one or more raising units 2f shown in FIG. 8 each having three lifting members 4 disposed in three cylinder bores 72, 73 and 74, respectively. The number of the raising units 2e or 2f to be combined is determined in accordance with the length of the article supporting apparatus to be manufactured.

The raising units 2e and 2f can be used in combination to provide a desired number of the lifting members 4. For example, if four lifting members 4 are required, two raising units 2e can be used in combination. For six lifting members 4, two units 2f or three units 2e are combined. For seven lifting members 4, two units 2e and one unit 2f may be combined. For example, one raising unit 2e and one raising unit 2f can be combined as shown in FIG. 9 so that an article supporting apparatus 1e with five lifting members 4 can be provided. Of course, the raising units 2e and 2f can be combined with one or more raising units 2, 2a, 2b, 2c or 2d which has one lifting member 4.

In FIGS. 7 and 8, a reference numeral "75" denotes through-holes for the mounting bolts 25. The reference numerals in FIGS. 7–9 and FIGS. 2(a)–2(b) denote similar components or functions. The details of the structure of each raising unit 2e or 2f are not described, but the structure of the raising unit 2, 2a, 2b, 2c or 2d can be used for them. In such a case, two or three casings 5 are fabricated as a single body, and, in addition to the air paths 6 and 7, air paths 76 interconnecting adjacent ones of the pressure chambers 24 in the same unit are provided.

The mount 3 for the article supporting apparatuses 1–1e has been described as being provided by a single, flat, elongated plate member 30. However, since the plate member 30 does not define the inner surface of the pressure chamber 24 of the apparatus 1 or 1a, it may be formed in a plurality of sections which abut against longitudinally adjacent ones at locations at the centers of the respective raising units 2 or 2a. Thus, although the mount 3 is divided into plural sections, each section connects adjacent ones of raising units, so that the number of raising units can be freely changed as desired. A number of such sections can be prepared beforehand, and a desired number of raising units can be combined, using the divided mount sections. Accordingly, it will take a shorter time to manufacture and ship article supporting apparatuses of an ordered length, using such divided mounting plate, than manufacturing and using a single mounting plate having the ordered length.

The article supporting apparatus of the present invention can be used with a die carrying apparatus for a die-casting machine, a workpiece mount of various processing machines, such as a machining center, a milling machine and a shearing machine, and any other article carrying surfaces, for facilitating easy removal, position change, positioning etc. of articles.

What is claimed is:

1. An apparatus for movably supporting an article, comprising a plurality of raising units and a mount on which said raising units are adapted to be mounted in a row with outer side surfaces of adjacent ones of said raising units contacting each other;

wherein each of said raising units comprises:

a vertically movable lifting member including a piston and a freely rotatable ball disposed on top of said piston;

a casing having a cylinder bore therein opening in the upper surface of said casing, said lifting member being disposed in said cylinder bore in a vertically movable manner such that a portion of said ball can protrude above the upper surface of said casing when said lifting member is in an elevated position thereof, said casing including a pressure chamber beneath said piston; and an air path extending from one side surface to the opposing side surface of said casing through said pressure chamber; and wherein a plurality of such raising units are mounted in a row on said mount in such a manner that said air path of one rasing unit can communicate with said air paths of adjacent raising units, whereby when compressed air is supplied to said pressure chamber of the raising unit at one end of the row of raising units through said air path thereof, the compressed air is also supplied to said pressure chambers of the remaining raising units in said row through said respective air paths.

2. The apparatus according to claim 1 wherein:

aid piston provides a first piston, said cylinder bore provides a first cylinder bore, said pressure chamber provides a first pressure chamber, and said casing provides a first cylinder section; and the apparatus further comprises a second cylinder section disposed beneath said first cylinder section to form a unitary double-cylinder casing together with said first cylinder, said second cylinder section being supplied with a pneumatic pressure from said first pressure chamber, to thereby provide a lifting force to be added to the lifting force of said first piston.

3. The apparatus according to claim 1 wherein said mount comprises an elongated plate member.

4. The apparatus according to claim 2 where said mount comprises an elongated plate member.

5. The apparatus according to claim 2 wherein said second cylinder section comprises:

a second cylinder bore separated from said first cylinder bore by the bottom wall of said first pressure chamber;

a second piston disposed in said second cylinder bore in such a manner as to provide a second pressure chamber therebeneath;

a piston rod extending upward from said second piston hermetically and slidably through said bottom wall of said first pressure chamber and abutting against the bottom surface of said first piston; and a communication path extending through said piston rod for making said first and second pressure chambers communicate with each other.

6. The apparatus according to claim 2 wherein said second cylinder section comprises:

a second cylinder bore separated from said first cylinder bore by the bottom wall of said first pressure chamber;

a second piston disposed in said second cylinder bore in such a manner as to provide a second pressure chamber therebeneath;

a piston rod extending hermetically and slidably through said bottom wall of said first pressure chamber to interconnect said second piston and said first piston; and a communication path extending through said piston rod for making said first and second pressure chambers communicate with each other.

7. The apparatus according to claim 1 wherein:

said piston is a first piston, said cylinder bore provides a first cylinder bore, said pressure chamber provides a first pressure chamber, and said casing provides a first cylinder section;

the apparatus further comprises a second cylinder section including a second piston and being disposed beneath said first pressure chamber, said second cylinder section further including a second pressure chamber supplied with a pneumatic pressure from said first pressure chamber to thereby provide a lifting force to be added to the lifting force of said first piston, and a second cylinder bore with said second piston disposed therein, said second cylinder bore being formed in said mount.

8. The apparatus according to claim 7 further comprising a piston rod extending upward from said second piston hermetically and slidably through said bottom wall of said first pressure chamber and abutting against the lower surface of said first piston, and a communication path extending through said piston rod and making said first and second pressure chambers communicate with each other.

9. The apparatus according to claim 7 further comprising a piston rod extending hermetically and slidably through said bottom wall of said first pressure chamber and interconnecting said first and second pistons, and a communication path extending through said piston rod and making said first and second pressure chambers communicate with each other.

10. The apparatus according to claim 1 further comprising upward movement limiting means for defining an upper limit of movement of said piston so that said ball protrudes above the upper surface of said casing by a predetermined amount when said lifting member is in said elevated position.

11. The apparatus according to claim 2 further comprising upward movement limiting means for defining an upper limit of movement of said first piston so that said ball protrudes above the upper surface of said casing by a predetermined amount when said lifting member is in said elevated position.

12. The apparatus according to claim 7 further comprising upward movement limiting means for defining an upper limit of movement of said first piston so that said ball protrudes above the upper surface of said casing by a predetermined amount when said lifting member is in said elevated position.

13. The apparatus according to claim 10 wherein said upward movement limiting means is provided by reducing the inner diameter of an upper portion of said cylinder bore.

14. The apparatus according to claim 11 wherein said upward movement limiting means is provided by reducing the inner diameter of an upper potion of said first cylinder bore.

15. The apparatus according to claim 12 wherein said upward movement limiting means is provided by reducing the inner diameter of an upper portion of said first cylinder bore.

16. The apparatus according to claim 10 wherein said upward movement limiting means comprises a piston rod extending downward from the bottom surface of said piston slidably and hermetically through said bottom wall of said pressure chamber beyond the lower surface of said bottom wall of said pressure chamber, and a member having a larger diameter than said piston rod, said member being disposed on said piston rod at a location spaced downward from said bottom surface of said piston.

17. The apparatus according to claim 11 wherein said upward movement limiting means comprises a piston rod extending downward from the bottom surface of said first piston slidably and hermetically through said bottom wall of said first pressure chamber beyond the lower surface of said bottom wall of said first pressure chamber, and a member having a larger diameter than said piston rod, said member being disposed on said piston rod at a location spaced downward from said bottom surface of said first piston.

18. The apparatus according to claim 12 wherein said upward movement limiting means comprises a piston rod extending downward from the bottom surface of said first piston slidably and hermetically through said bottom wall of said first pressure chamber beyond the lower surface of said bottom wall of said first pressure chamber, and a member having a larger diameter than said piston rod, said member being disposed on said piston rod at a location spaced downward from said bottom surface of said first piston.

19. The apparatus according to claim 1 wherein said casing is made from a generally rectangular parallelepiped block having predetermined dimensions.

20. The apparatus according to claim 2 wherein said casing is made from a generally rectangular parallelepiped block having predetermined dimensions.

21. The apparatus according to claim 7 wherein said casing is made from a generally rectangular parallelepiped block having predetermined dimensions.

22. The apparatus according to claim 1 wherein each raising unit is provided with a ball holder of synthetic resin, said ball holder having its lower portion engaging with said piston, having its upper portion covering said ball disposed on top of said piston and including a circular opening in its center through which a portion of said ball protrudes, and having such an outer peripheral surface as to slidably fit into an upper portion of said cylinder bore, the upper surface of said ball holder being flat, the outer peripheral edge of said upper surface of said ball holder and the peripheral edge of said circular opening being formed such as to provide dust seals.

23. The apparatus according to claim 2 wherein each raising unit is provided with a ball holder of synthetic resin, said ball holder having its lower portion engaging with said first piston, having its upper portion covering said ball disposed on top of said first piston and including a circular opening in its center through which a portion of said ball protrudes, and having such an outer peripheral surface as to slidably fit into an upper portion of said first cylinder bore, the upper surface of said ball holder being flat, the outer peripheral edge of said upper surface of said ball holder and the peripheral edge of said circular opening being formed such as to provide dust seals.

24. The apparatus according to claim 7 wherein each raising unit is provided with a ball holder of synthetic resin, said ball holder having its lower portion engaging with said first piston, having its upper portion covering said ball disposed on top of said first piston and including a circular opening in its center through which a portion of said ball protrudes, and having such an outer peripheral surface as to slidably fit into an upper portion of said first cylinder bore, the upper surface of said ball holder being flat, the outer peripheral edge of said upper surface of said ball holder and the peripheral edge of said circular opening being formed such as to provide dust seals.

25. The apparatus according to claim 1 wherein raising units each including a casting having one lifting member, raising units each including a casing having two lifting members, and raising units each including three lifting members are manufactured, and said apparatus comprises a combination of a desired number of said raising units having one lifting member, two lifting members and three lifting members.

26. The apparatus according to claim 2 wherein raising units each including a casing having one lifting member, raising units each including a casing having two lifting members, and raising units each including three lifting members are manufactured, and said apparatus comprises a combination of a desired number of said raising units having one lifting member, two lifting members and three lifting members.

27. The apparatus according to claim 7 wherein raising units each including a casing having one lifting member, raising units each including a casing having two lifting members, and raising units each including three lifting members are manufactured, and said apparatus comprises a combination of a desired number of said raising units having one lifting member, two lifting members and three lifting members.

* * * * *